Jan. 31, 1967 P. HAAKE 3,301,318
SYSTEM FOR STABILIZING THE TEMPERATURE OF A BATH AT A LOW LEVEL
Filed March 10, 1965
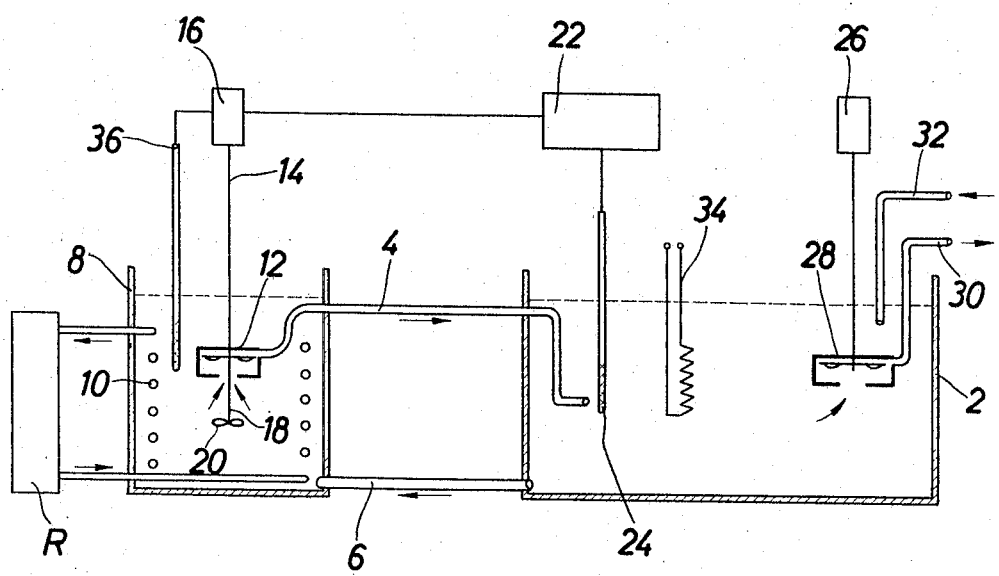
Inventor
Peter Haake
By
Attorney United States Patent Office 3,301,318
Patented Jan. 31, 1967

3,301,318
SYSTEM FOR STABILIZING THE TEMPERATURE OF A BATH AT A LOW LEVEL
Peter Haake, 6 Stettinerstrasse, Karlsruhe, Germany
Filed Mar. 10, 1965, Ser. No. 438,693
Claims priority, application Germany, Mar. 19, 1964, H 52,103
5 Claims. (Cl. 165—40)

My invention relates to a system for stabilizing the temperature of a bath at a low level and, more particularly, to such a system of the type in which the liquid of the bath is circulated by a pump from the vessel to a separate container and back from the container to the vessel, a cooling medium being passed through the container for cooling the liquid circulating therethrough. In a system of this type the temperature prevailing within the vessel is stabilized by controlling the circulation of the liquid between the container and the vessel. When the temperature prevailing in the vessel tends to rise above the desired level, the flow of the circulating liquid is sped up to thereby cool the bath more effectively. Inversely, when the temperature prevailing within the vessel tends to drop, the circulation of liquid is slowed down thereby permitting the temperature prevailing in the vessel to rise. In a prior system of this character a magnetic valve is provided for controlling the circulation of liquid and this valve is opened and closed by an on-off-controller under the influence of temperature-responsive means measuring the temperature prevailing within the vessel.

It is the primary object of my invention to simplify the system by elimination of such valve. It is a further object of my invention to provide improved controlling means for controlling the circulation of liquid between the vessel and the container to thereby stabilize the temperature prevailing within the vessel with great accuracy.

Moreover, it is an object of my invention to prevent the circulation of liquid between the vessel and the container from transferring excessive heat to the source of cooling fluid from which the cooling medium is passed through the container.

Further objects of my invention will appear from a detailed description of a preferred embodiment of my invention following hereinafter. It is to be understood, however, that my invention is in no way restricted or limited to the details of such embodiment but is capable of numerous modifications within the scope of the appended claims and that the terms and phrases used in such description are not intended to restrict or limit the scope of the invention but are of a merely descriptive character.

The accompanying drawing illustrates a system for stabilizing the temperature of a bath at a low level in a diagrammatic fashion, the vessel and the container forming part of this system being shown in a vertical section.

The vessel 2 contains the bath of liquid, the temperature of which is to be stabilized at a level below normal room temperature. For this purpose means are provided for circulating the liquid of the bath from the vessel 2 to a separate container 8 and back from the container 8 to the vessel. These means include a pair of pipes 4 and 6 each extending between the vessel 2 and the container 8 and a pump 12 communicating with at least one of the pipes. In the embodiment shown the pump is of the centrifugal type and its peripheral outlet port communicates with the pipe 4 whereas its central inlet port communicates with the interior of the container 8.

Cooling means are provided for passing a cooling medium through the container 8 in heat-exchanging relationship to the liquid therein.

In the embodiment shown this cooling means is formed by a helical pipe coil 10 coaxially surrounding the centrifugal pump 12. The ends of this coil are connected by pipes extending through the wall of the container 8 to a refrigerator R which includes means for circulating the cooling medium in the direction of the arrows through the coil 10.

The vertical shaft 14 of the centrifugal pump 12 extends upwardly above the level of the liquid and is connected with driving means such as the rotor of an electric motor 16 mounted on a stationary frame (not shown).

For the purpose of controlling the temperature prevailing within the liquid in vessel 2, the speed of rotation of the motor 16 is varied. In this respect my invention differs from a prior system in which a magnetic valve was inserted in the pipe 4 and adapted to be intermittently closed and opened for variable periods to thereby influence the cooling effect exerted by the circulation of the medium upon the temperature prevailing within the vessel 2.

Preferably, the shaft 14 on which the rotary impeller of the pump is mounted extends downwardly below the housing of the pump 12 and carries suitable agitating means, for instance a rotor having agitating vanes 20 surrounded by the cooling coil 10. The agitation of the liquid by the agitator 20 enhances the heat exchange between the cooling medium passing through the coil 10 and the liquid surrounding the coil 10.

For the purpose of automatically varying the speed of motor 16 so as to meet the requirements for the stabilization of the temperature in vessel 2, suitable control means diagrammatically indicated at 22 are cooperatively connected with temperature-responsive means 24 immersed in the liquid of vessel 2 and with the motor 16. The temperature-responsive means may be formed by any suitable thermostat known in the art. The control means 22 may be formed by a controller of any known type provided with manually adjustable means for setting up the selected temperature to be maintained within the liquid in vessel 2. The controller is operative to compare the selected temperature with the temperature measured by the thermostat 24 and to so control the speed of motor 16 as to increase the speed of actuation of the pump 12 in response to an increase of the temperature prevailing within vessel 2 and for reducing the speed of actuation of the pump 12 in response to a decrease of the temperature measured by thermostat 24.

As controllers of this type are well known in the art and do not form part of my invention, a detailed description thereof is deemed dispensable herewith.

Preferably, the variation of speed of motor 16 is continuously dependent upon the changes of temperature measured by thermostat 24. More particularly, the speed of motor 16 may be changed in proportion to the difference of the measured temperature from the selected temperature.

It is also possible, however, to control motor 16 by an on-off-control. In this case the controller 22 is of the known type which intermittently interrupts the electrical circuit of motor 16 for variable periods controlled by thermostat 24. In this event a manually adjustable variable resistor may be interposed in the energizing circuit of motor 16. This resistor is preferably so manually adjusted as to render the feeding capacity of pump 12 sufficient to satisfy the average cooling demand of vessel 2 in a coarse manner.

The bath in vessel 2 may be utilized for different purposes. Thus, an article to be maintained on a predetermined temperature may be immersed in the bath in vessel 2. Alternatively, the liquid of the bath may be fed to any desired location by a centrifugal pump 28 mounted within the vessel 2 and by a pressure pipe 30 connected to the pump 28, the latter being driven by an electric motor 26. From the location where the liquid is used for temperature-stabilizing purposes the liquid will be returned through a return pipe 32 terminating in the vessel 2.

Preferably, the vessel 2 may be provided with an electrical heating element 34 mounted therein. This heating element may be continuously energized by an electrical current, when the selected temperature to be maintained within the vessel 2 exceeds the normal room temperature. As a result, the temperature will be stabilized by the controlled circulation through vessel 2 of the cooled liquid passing through pipes 4 and 6 and pump 12. In this operation it might happen under adverse circumstances that the return pipe 6 supplies an excessive quantity of comparatively warm liquid to the container 8 causing the helical cooling coil 10 to be excessively heated to a temperature exceeding normal room temperature. This is undesirable, however, as transfer of excessive heat to coil 10 may damage the refrigerator R. In order to prevent such damage, a thermostat 36 is preferably mounted within the container 8 inside of the heating coil 10. In response to a rise of the temperature prevailing within the container 8 above a predetermined limit the thermostat 36 interrupts the electrical circuit of motor 16 thereby temporarily stopping the same until the temperature measured by thermostat 36 will have dropped below such limit.

The provision of the thermostat 36 offers an additional advantage. When the system is put in operation at a time when the liquid prevailing within the container 8 is abnormally warm, for instance because of a high room temperature, the thermostat 36 will postpone a circulation of liquid through container 8 until the temperature prevailing therein has been decreased to a satisfactory degree. This decrease will occur within a very short time as the quantity of liquid in the container 8 is small compared with the volume of the bath in vessel 2.

If desired, the thermostat 36 may supply a control signal to the input of controller 22 causing the latter to reduce the speed of motor 16, when the temperature prevailing in container 8 exceeds a certain limit. Moreover, the controller 22 may be used to control the electrical energy supplied to the heating element 34, if desired.

The embodiment described hereinabove is capable of numerous modifications. While I prefer to mount the pump 12 in the container 8, to obtain the best possible results, it is possible under certain circumstances to interpose the pump 12 in the liquid circuit extending through pipe 4, vessel 2, pipe 6 and container 8 at any other suitable point of such circuit.

From the foregoing it will be seen that this invention is one well adapted to attain all of the objects hereinabove set forth together with other advantages which are obvious or which are inherent to the apparatus and system.

While the invention has been described in connection with a preferred embodiment thereof, it will be understood that it is capable of further modification and this application is intended to cover any variations, uses, or adaptations of the invention following, in general, the principles of the invention and including such departures from the present disclosure as come within known or customary practice in the art to which the invention pertains and as fall within the scope of the invention or the limits of the appended claims.

The advantages of the invention as here outlined are best realized when all of its features and instrumentalities are combined in one and the same structure, but useful devices may be produced embodying less than the whole.

What I claim is:

1. In a system for stabilizing the temperature of a bath at a low level, the combination comprising a vessel containing a bath, a container, means for circulating the liquid of said bath from said vessel to said container and back from the latter to said vessel, said circulating means including a pair of pipes each extending between said container and said vessel and a pump mounted within said container and communicating with at least one of said pipes, a motor for actuating said pump, temperature-responsive means disposed within said vessel, control means cooperatively connected with said temperature-responsive means and with said motor for speeding up the same in response to an increase of the temperature prevailing within said bath and for slowing down said motor in response to a decrease of said temperature, agitating means connected with said motor to be driven thereby, a cooling pipe coil mounted within said container and surrounding said pump and said agitating means, and a source of a cooling medium connected to said pipe coil for passing the cooling medium therethrough.

2. The combination claimed in claim 1 further comprising a second temperature-responsive means mounted within said container and connected with said motor for stopping said motor in response to an increase of the temperature prevailing within said container beyond a predetermined limit.

3. The combination claimed in claim 1 further comprising heating means mounted within said vessel for heating the bath therein.

4. In a system for stabilizing the temperature of a bath at a low level, the combination comprising a vessel containing a bath, a container, means for circulating the liquid of said bath from said vessel to said container and back from said container to said vessel, said means including a pair of pipes each extending between said vessel and said container and a pump communicating with at least one of said pipes, driving means for driving said pump, cooling means for passing a cooling medium through said container in heat-exchanging relationship to said liquid, a source of a cooling fluid connected with said cooling means, agitating means mounted in said container for agitating the liquid contacting said cooling means, and means for varying the speed of operation of said pump.

5. The combination claimed in claim 4 in which said pump is located within said container, said cooling means being formed by a helical pipe coil surrounding said pump and said agitating means, the latter being formed by a rotor having agitating vanes, a common driving shaft being provided for said pump and for said rotor and being connected with said driving means.

References Cited by the Examiner
UNITED STATES PATENTS

| | | | |
|---|---|---|---|
| 2,132,234 | 10/1938 | Fick | 62—333 X |
| 2,301,938 | 11/1942 | Fator | 62—185 X |
| 2,372,087 | 3/1945 | Karassik | 122—451 |

MEYER PERLIN, *Primary Examiner.*

ROBERT A. O'LEARY, *Examiner.*

N. R. WILSON, *Assistant Examiner.*